(12) United States Patent
Yu (10) Patent No.: US 12,471,198 B1
(45) Date of Patent: Nov. 11, 2025

(54) ENHANCED TOOLS AND TECHNIQUES FOR OPERATIONAL CONTROL AND CONFIGURATION OF LIGHTING SYSTEMS AND ASSEMBLIES

(71) Applicant: Chung Han Yu, City of Industry, CA (US)

(72) Inventor: Chung Han Yu, City of Industry, CA (US)

(*) Notice: Subject to any disclaimer, the term of this patent is extended or adjusted under 35 U.S.C. 154(b) by 260 days.

(21) Appl. No.: 17/901,931

(22) Filed: Sep. 2, 2022

(51) Int. Cl.
*H05B 47/10* (2020.01)
*F21V 23/00* (2015.01)
*F21V 23/04* (2006.01)
*H05B 47/17* (2020.01)

(52) U.S. Cl.
CPC ........... *H05B 47/17* (2020.01); *F21V 23/004* (2013.01); *F21V 23/04* (2013.01)

(58) Field of Classification Search
CPC ........ H05B 47/00; H05B 47/10; H05B 47/17; H05B 47/196; F21V 23/00; F21V 23/002; F21V 23/004; F21V 23/04; F21V 23/0414; F21V 23/0442; F21V 21/00; F21V 21/12
See application file for complete search history.

(56) References Cited

U.S. PATENT DOCUMENTS

| | | | | |
|---|---|---|---|---|
| 10,091,855 B2 * | 10/2018 | Van Winkle | ........... | H05B 45/20 |
| 10,733,944 B2 * | 8/2020 | Kumar | ................ | G09G 3/3413 |
| 11,317,492 B2 * | 4/2022 | Jeswani | ................ | H05B 45/00 |
| 2005/0128751 A1 * | 6/2005 | Roberge | .................... | F21K 9/00 |
| | | | | 362/276 |
| 2009/0309501 A1 * | 12/2009 | Catalano | ................ | F21K 9/233 |
| | | | | 315/158 |
| 2017/0013695 A1 * | 1/2017 | Kelley | ................ | H05B 47/115 |
| 2018/0310381 A1 * | 10/2018 | Bowen | ................ | F21V 23/002 |

* cited by examiner

Primary Examiner — Thai Pham
(74) Attorney, Agent, or Firm — Leech Tishman Fuscaldo & Lampl, LLC (57) ABSTRACT

A lighting control apparatus is provided for use in connection with a lighting system, the apparatus includes a circuit board configured for performing multiple illumination functions for the lighting system; and at least one control switch structured for accessibility by a user without disassembly of the lighting control apparatus, and direct interface with the circuit board for adjusting at least one aspect of the illumination functions of the lighting system. Also, the lighting control apparatus is structured to be readily accessible and readily insertable into or readily removable from the conduit portion.

18 Claims, 9 Drawing Sheets

Photocontrol detects low light; Fixture is ON

FIG. 10

Photocontrol detects daylight; Fixture is OFF

ENHANCED TOOLS AND TECHNIQUES FOR OPERATIONAL CONTROL AND CONFIGURATION OF LIGHTING SYSTEMS AND ASSEMBLIES

FIELD OF THE INVENTION

In various embodiments, the present invention generally relates to the operational aspects and configuration of lighting systems and lighting assemblies.

BACKGROUND

Providing effective lighting and illumination is an essential aspect of many aspects of society, whether in residential, commercial, industrial, indoor, outdoor settings, or in many other environments, and/or for many different purposes. Typically, the controls provided with more complex lighting systems and lighting assemblies are not user friendly. Many lighting systems require significant disassembly, physical reconfiguration, or complicated process steps to make changes in how and when illumination is generated by the lighting system. Complicated wireless remote control systems often do not function as intended, and can be difficult to repair when not functioning properly or not functioning at all.

What are needed therefore are enhanced tools and techniques for enabling more effective and efficient user access to and control of lighting system configuration modifications, including operational parameters which control the illumination generated by the lighting system.

DESCRIPTION

In developing the various embodiments of the invention, the inventor has realized the benefits of providing a lighting system or lighting assembly with illumination controls located in a readily manually accessible portion of the lighting system. In certain embodiments, the entire controller unit can be readily and conveniently removed, such as for maintenance or component replacement, without complete disassembly or disruption of the entire lighting system or major system sub-components.

Figure 1:
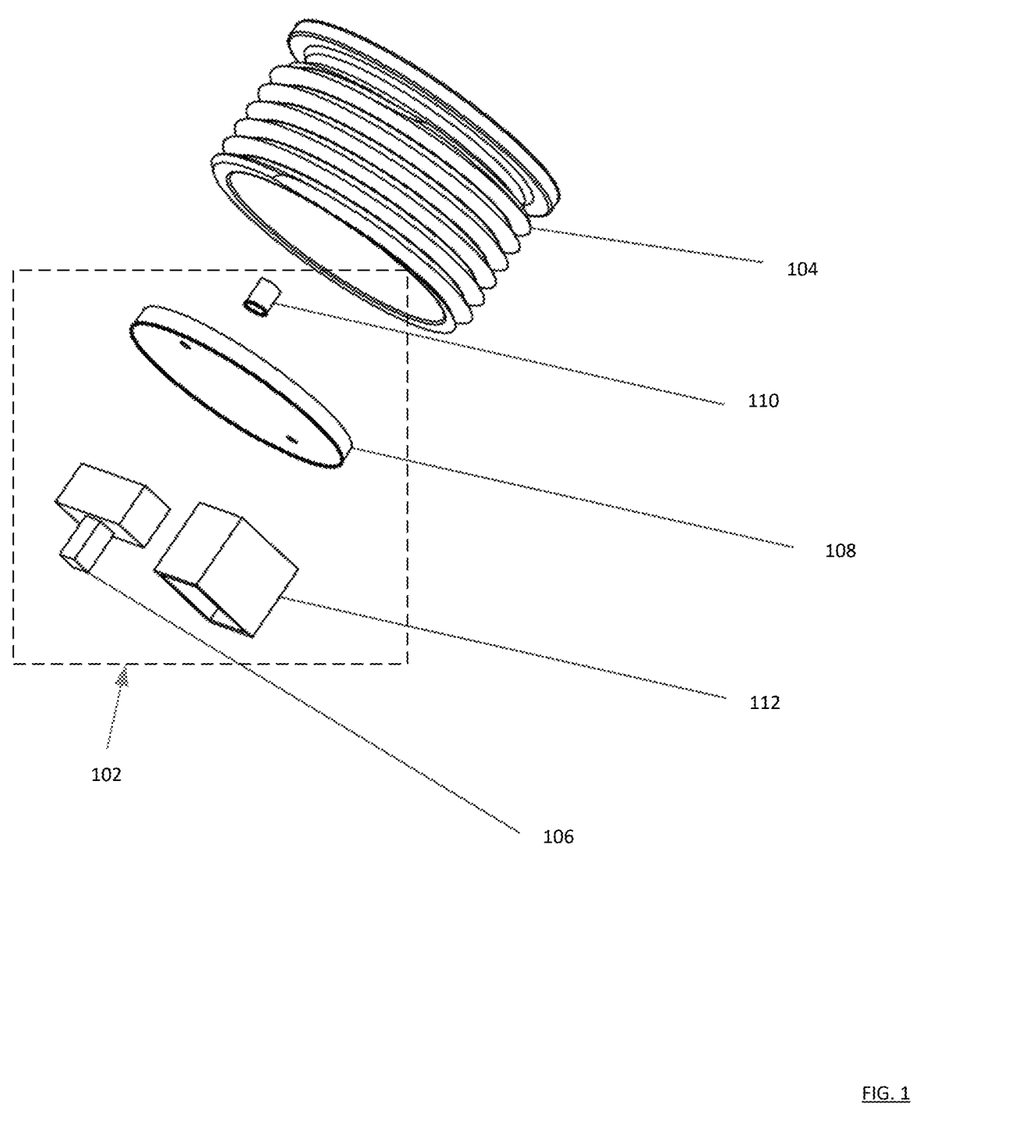
FIG. 1 includes an exploded three-dimensional view of one example of a lighting control apparatus structured for combination with a conduit portion in accordance with certain embodiments of the present invention.

FIG. 1 includes an exploded three-dimensional view of one example of a lighting control apparatus 102 structured as shown for combination with a conduit portion 104 in accordance with certain embodiments of the present invention. In this example, this configuration provides a photo-controlled color selector mounted in a 0.75 inch NPT conduit portion 104. One important advantage of this configuration is that the lighting control apparatus 102 is readily accessible and readily removable. Also, a control switch 106 can be positioned on the configuration in a location which allows a user to manually turn on and off the photocontrol, for example, without opening the fixture in which the configuration has been installed. It also allows for the entire lighting control apparatus 102 to be removed, if required.

In various embodiments, the lighting control apparatus 102 includes a circuit board 108 configured with at least one of hardware, firmware, software, or circuitry, or a combination thereof, for performing multiple illumination functions for the apparatus 102. In one embodiment, the circuit board 108 may be embodied as a printed circuit board (e.g., GK-01.A1, FR-4, double layer φ21*1.5 mm, white oil, black character, lead-free tin spray, and rated UL 94V-0). The control switch 106 can be positioned on the circuit board 108 in a manner which allows a user to manually and conveniently turn on and off the photocontrol function of the apparatus 102. In one embodiment, the control switch 106 may be a two-stage slide switch (e.g., SS12D02VG (4) 0.3A/50V, 8.6*7.5*4.4 mm, shank height 4 mm). In certain embodiments, a photodiode 110 can be operatively associated with the circuit board 108. The photodiode 110 can be embodied as a light-sensitive semiconductor diode which produces electrical current in response to absorbing photons. In one embodiment, the photodiode can be provided as a model 5JMSC00, short hair, @5*5.2 mm, with PIN foot length 18.5 mm/15 mm and supporting a power supply, for example.

Figure 2:
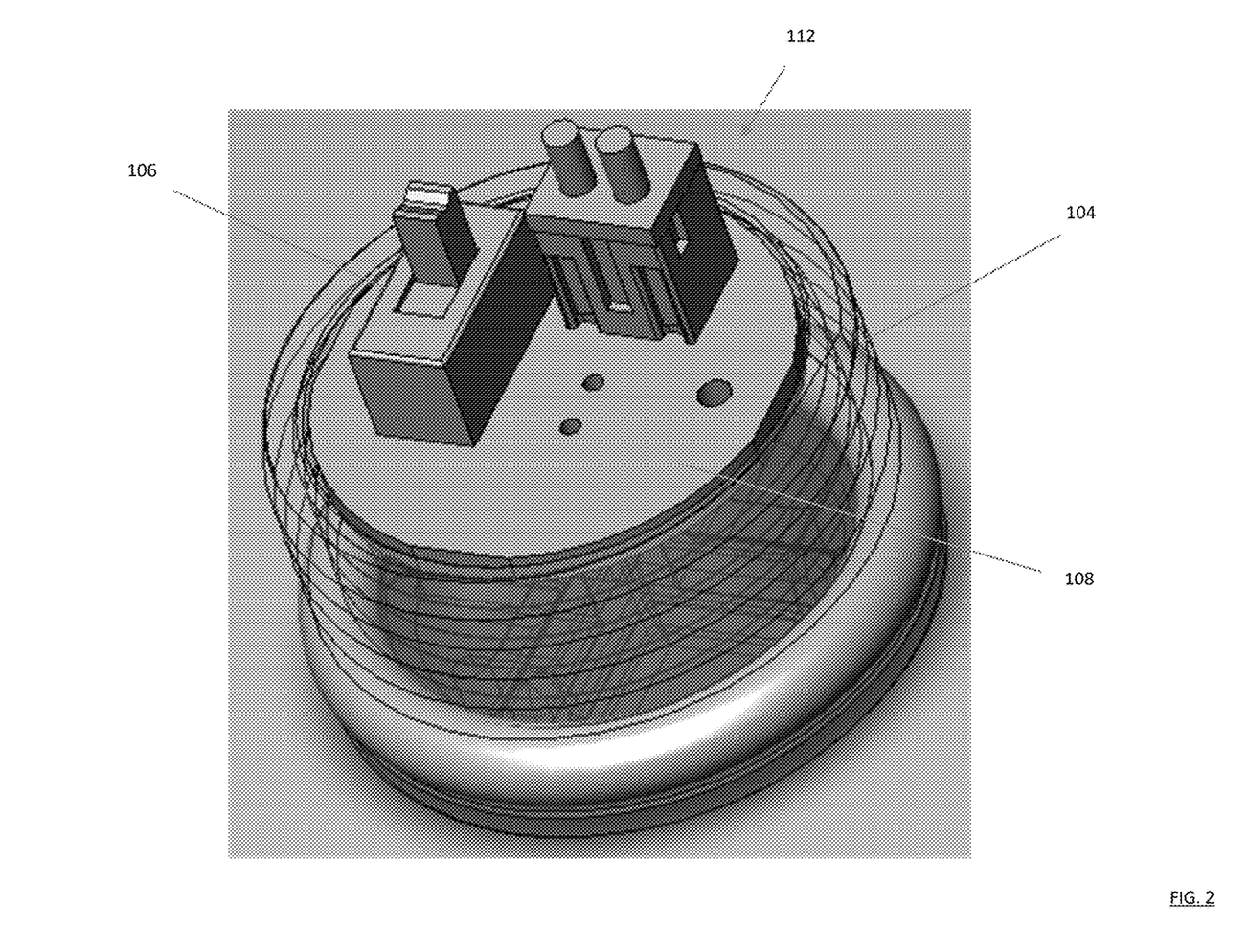
FIG. 2 includes a three-dimensional, partially transparent view of another example of a lighting control apparatus structured in accordance with certain embodiments of the present invention.
Figure 3:
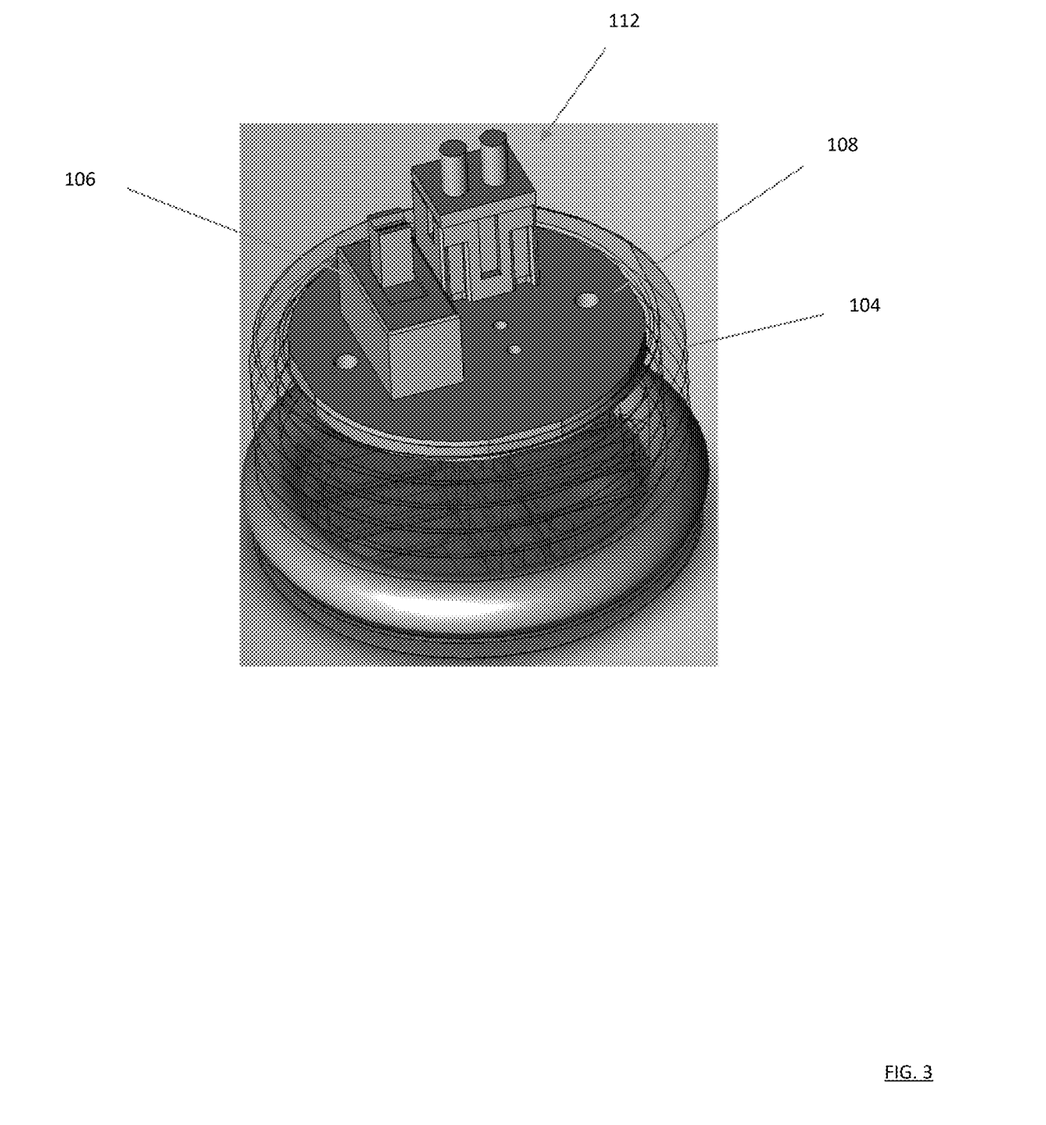
FIG. 3 includes an alternative three-dimensional view of the lighting control apparatus of FIG. 2.
Figure 4:
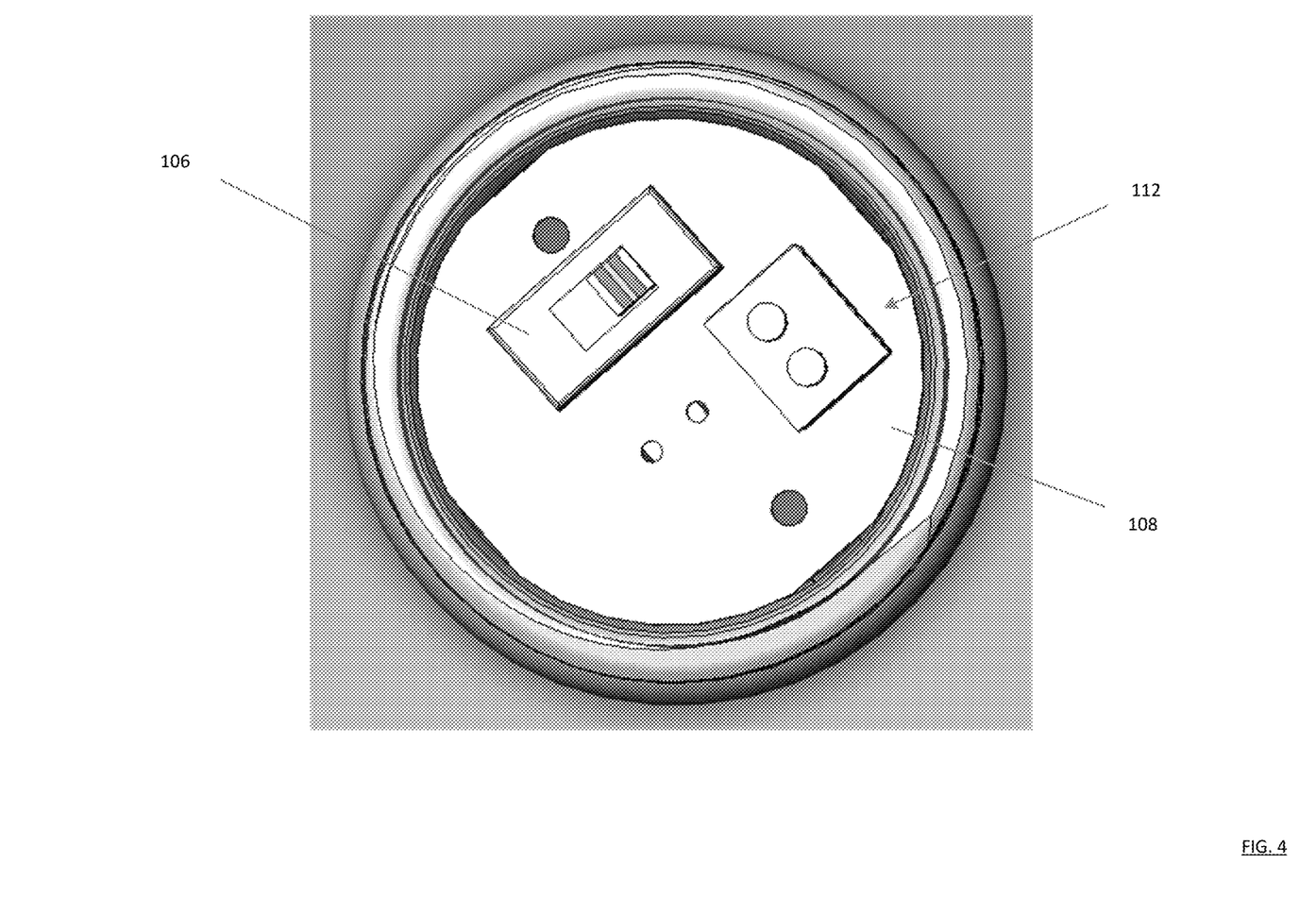
FIG. 4 includes a top plan view of the lighting control apparatus of FIG. 2.

FIG. 2 includes a three-dimensional, partially transparent view of another example of the lighting control apparatus 102 structured in accordance with certain embodiments of the present invention. In this example, a power/communication adapter 112 can be installed for operative interaction with the circuit board 108, such as to supply electrical power to the circuit board 108, and/or to communicate control signals to or from the circuit board 108, for example. In another aspect, FIG. 3 includes an alternative three-dimensional view of the lighting control apparatus of FIG. 2. In another aspect, FIG. 4 includes a top plan view of the lighting control apparatus of FIG. 2.

Figures 5, 6:
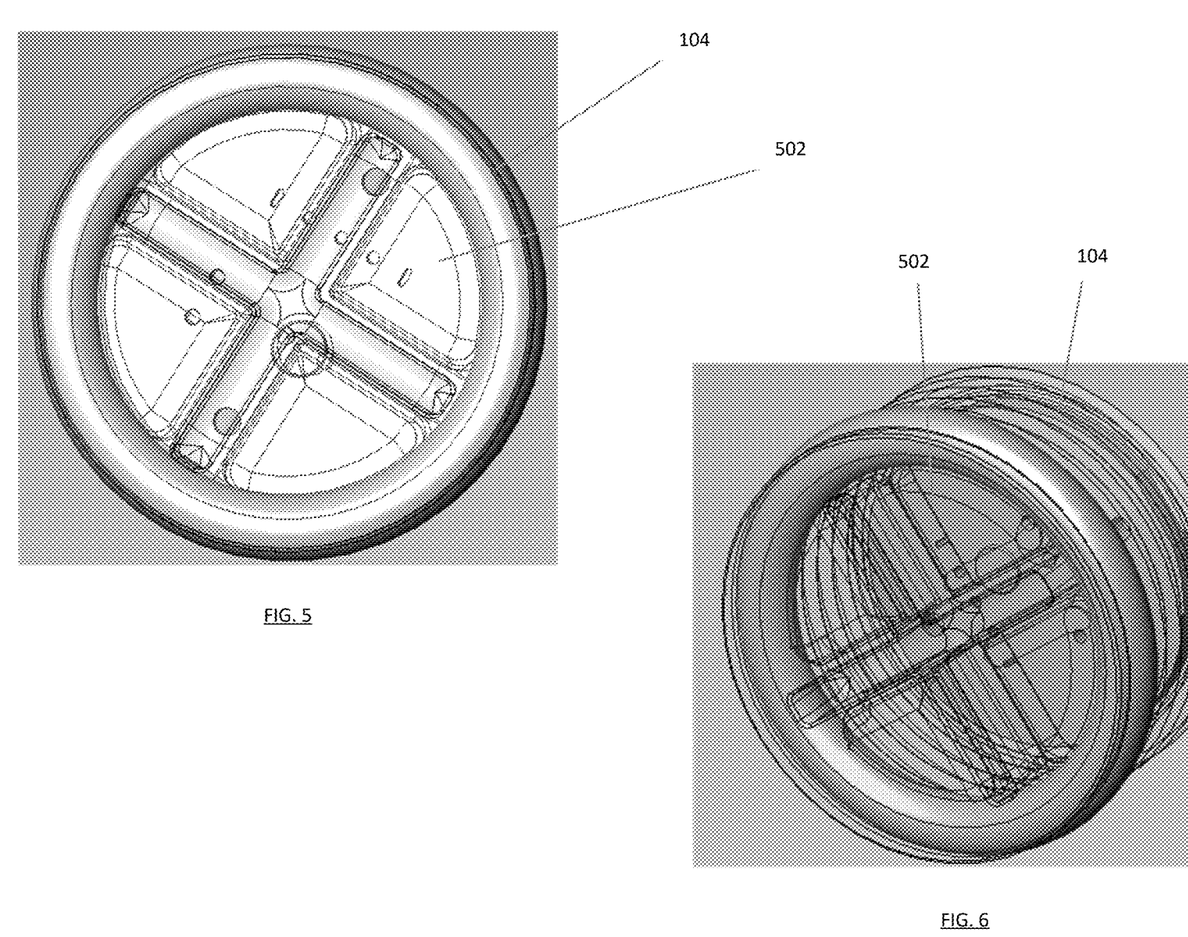
FIG. 5 includes an alternative three dimensional view of the lighting control apparatus of FIG. 2.
FIG. 6 includes an alternative three dimensional view of the lighting control apparatus of FIG. 2.

FIG. 5 includes an alternative three dimensional view of the lighting control apparatus of FIG. 2 depicting a bottom portion 502 of the conduit portion 104. As shown, the bottom portion 502 can be structured in a manner that facilitates interaction of the conduit portion with a lighting system for which the light control apparatus 102 provides its control functionality. FIG. 6 includes an alternative three dimensional view of the lighting control apparatus of FIG. 2, which depicts a different view of the bottom portion 502 of the conduit portion 104.

Figure 7:
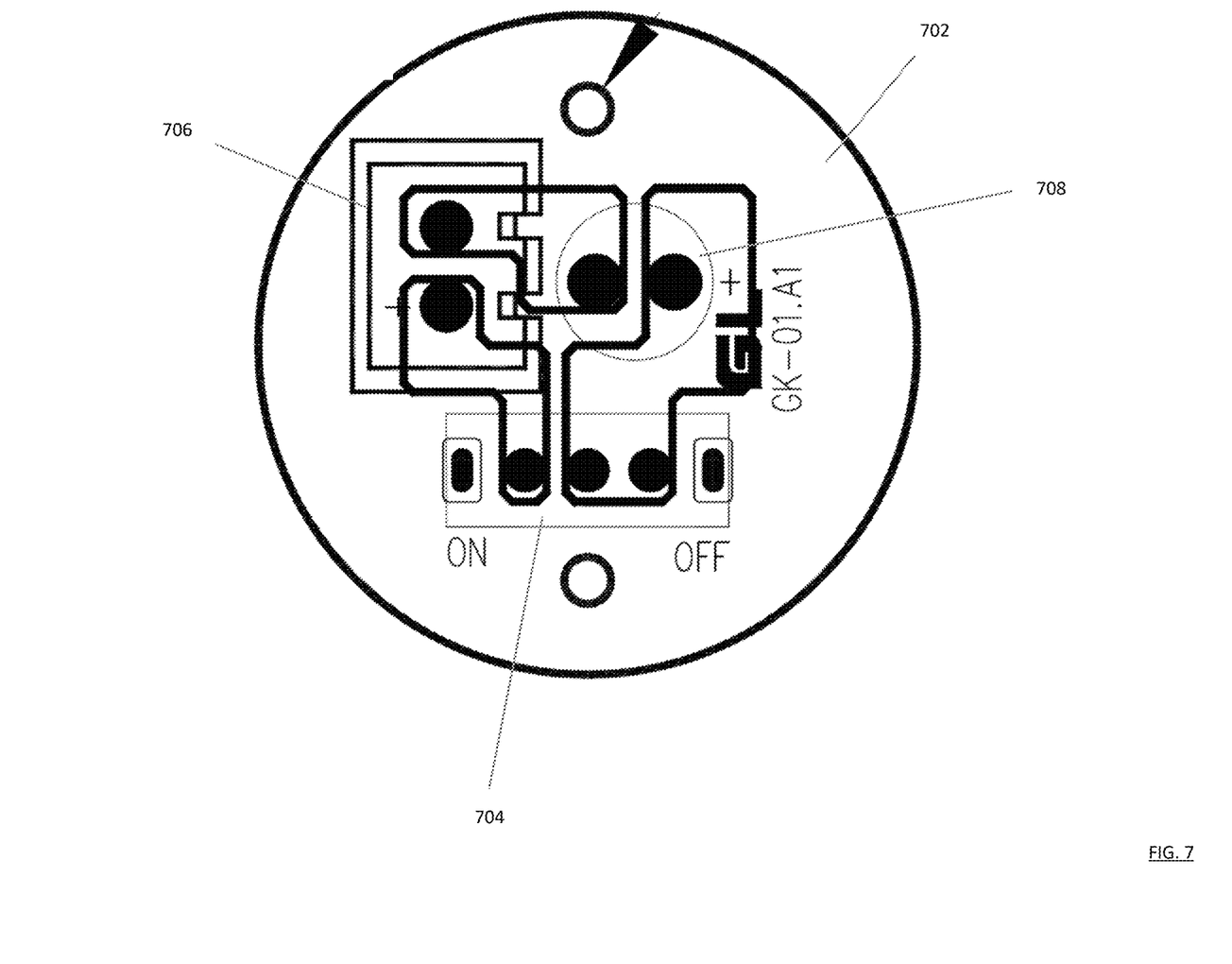
FIG. 7 illustrates a circuit schematic which can be implemented in connection with a circuit board in connection with certain embodiments of the present invention.

FIG. 7 illustrates one example of a circuit schematic 702 which can be implemented in connection with the circuit board 108 in connection with certain embodiments of the present invention. In this example, the circuit schematic 702 includes a control switch portion 704 including printed circuitry for directing electrical current in accordance with a selection position of the control switch 106, for example. A power/communication adapter portion 706 includes printed circuitry for directing electrical current in accordance with power or control signals, for example, received and processed through the power/communication adapter 112. Also, a photodiode portion 708 including printed circuitry for directing electrical current flowing in association with the operation and function of the photodiode 110, for example.

Figure 8:
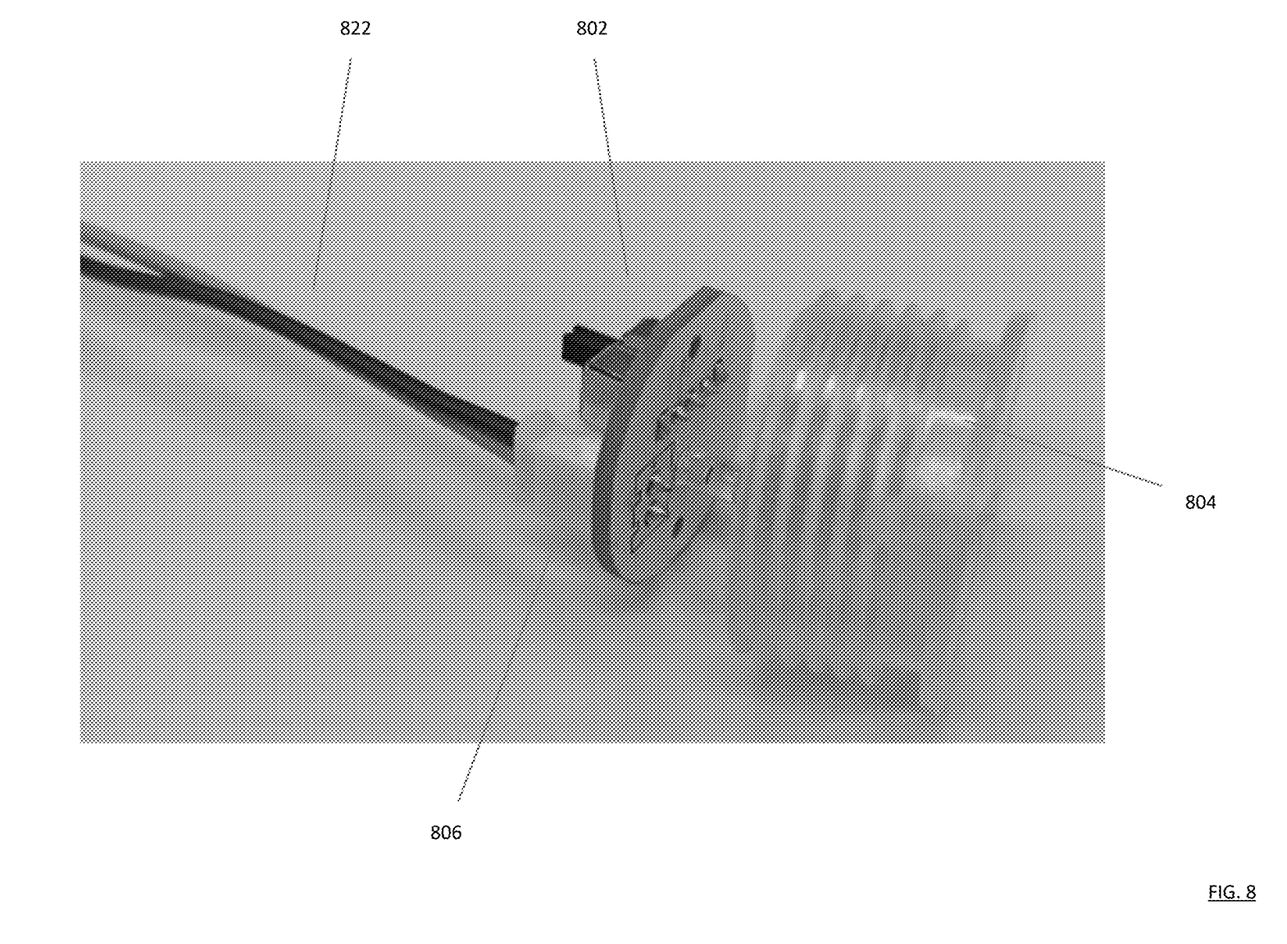
FIG. 8 shows a three-dimensional view of another example of a lighting control apparatus structured for combination with a conduit portion in accordance with certain embodiments of the present invention.

FIG. 8 shows a three-dimensional view of another example of a lighting control apparatus 802 structured for combination with a conduit portion 804 in accordance with certain embodiments of the present invention. In this example, a power/communication adapter 806 of the apparatus 102 can be electrically connected to receive power and/or communication signals through electrical wires 822, as shown.

Figure 9:
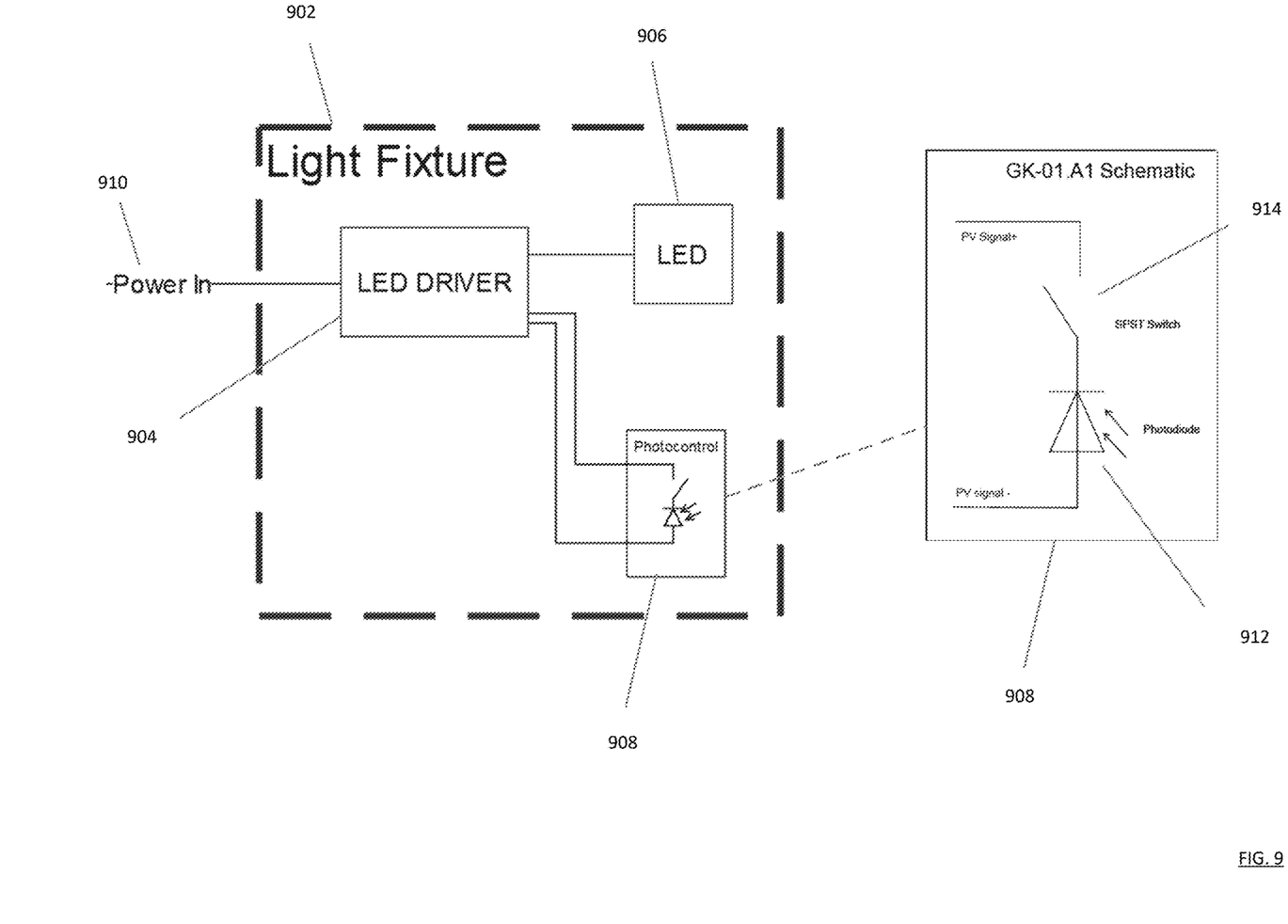
FIG. 9 schematically illustrates a lighting fixture circuit which can be used in association with certain lighting system embodiments of the present invention.

FIG. 9 schematically illustrates a lighting fixture circuit 902 which can be used in association with certain lighting system embodiments of the present invention. Among other potential components or modules, the circuit 902 can include an LED driver 904 operatively connected to an LED light source 906 and a photocontrol 908. The circuit 902 can receive power from an appropriate external power source 910, as shown. The photocontrol 908 includes a photodiode 910 configured to vary in electrical resistance based on the amount of light present in an ambient environment in which the circuit 902, and its associated lighting system, have been installed. In one embodiment, a 12V signal can be applied as input voltage for the photocontrol 908.

When there is a sufficient amount of light in the ambient environment sensed by the lighting system, the electrical resistance in the photodiode 912 correspondingly drops. In this operating state, electrical current flows through the photocontrol 908 circuit. The LED driver 904 responds to the signal represented by the current flow by turning off its output to the LED 906, thereby deactivating the lighting system as a light source. Similarly, when there is not a sufficient amount of light in the ambient environment sensed by the lighting system, the electrical resistance in the photodiode 912 correspondingly rises. In this operating state, electrical current stops flowing through the photocontrol 908 circuit. The LED driver 904 responds to the loss of the signal representing the current flow by turning on its output to the LED 906, thereby activating the lighting system as a light source.

Figure 10:
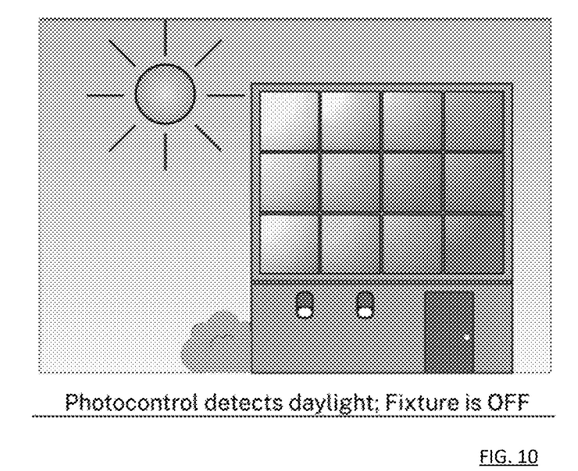
FIG. 10 illustrates an example of a scenario in which a lighting system has been deactivated and does not generate a light source in view of ambient lighting conditions.
Figure 11:
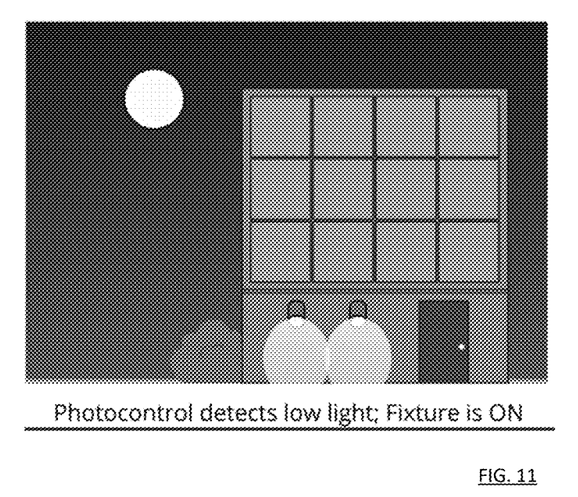
FIG. 11 illustrates an example of a scenario in which a lighting system has been activated to generate a light source in view of ambient lighting conditions.

FIG. 10 illustrates an example of a scenario in which a lighting system has been deactivated and does not generate a light source in view of ambient lighting conditions. In this example, the lighting system has been deactivated, because it is daytime in an outdoor environment and activation of the lighting system is not required. FIG. 11 illustrates an example of a scenario in which a lighting system has been activated to generate a light source in view of ambient lighting conditions. In this example, the lighting system has been activated because it is now nighttime in the outdoor environment and activation of the lighting system to provide a light source is required.

The examples presented herein can be intended to illustrate potential and specific implementations of the present invention. It can be appreciated that the examples can be intended primarily for purposes of illustration of the invention for those skilled in the art. No particular aspect or aspects of the examples can be necessarily intended to limit the scope of the present invention. For example, no particular aspect or aspects of the examples of lighting system assemblies, circuit diagrams, or other illustrative schematics described herein are necessarily intended to limit the scope of the invention unless included in the claims for this application.

It is to be understood that the figures and descriptions of the present invention have been simplified to illustrate elements that can be relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore, the invention as may be defined by such means-plus-function claims, resides in the fact that the functionalities provided by the various recited means can be combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium. In certain embodiments, artificial intelligence techniques, machine learning algorithms, and/or rules-based algorithms may be employed as unconventional tools for performing the processes and executing the computer systems described herein.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual (e.g., cloud-based), permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth.

Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, processor, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to execution of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that can be located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal; and examples of scripting languages include Bourne script, JavaScript, Python, TypeScript, Ruby, PHP, and Perl. Various embodiments may be employed in a Lotus Notes environment, for example. Such software may be stored on any type of suitable computer-readable medium or media such as, for example, a magnetic or optical storage medium.

Thus, the execution and behavior of the embodiments can be described without specific reference to the actual software code. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, cellular network communication, power line communication, or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs) remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 (Oracle) application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture. Certain embodiments of the invention may employ web servers such as Apache web servers, for example.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Various embodiments may be described herein in the general context of computer executable instructions, such as software, program modules, and/or engines being executed by a computer. Generally, software, program modules, and/or engines include any software element arranged to perform particular executions or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where executions can be performed by one or more remote processing devices that can be linked through a communications network. In a distributed computing environment, software, program modules, and/or engines may be located in both local and remote computer storage media including memory storage devices.

Although some embodiments may be illustrated and described as comprising functional components, software, engines, and/or modules performing various executions, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various executions of one or more embodiments. In various embodiments, for example, the article of manufacture may comprise a magnetic disk, optical disk, flash memory or firmware containing computer program instructions suitable for execution by an application specific processor.

Additionally, it is to be appreciated that the embodiments described herein illustrate example implementations, and that the functional elements, logical blocks, modules, and circuits elements may be implemented in various other ways which can be consistent with the described embodiments. Furthermore, the executions performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Reference to "one embodiment" or "an embodiment" means that a particular feature, structure, or characteristic described in connection with the embodiment is comprised in at least one embodiment. The appearances of the phrase "in one embodiment" or "in one aspect" in the specification can be not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms can be not necessarily intended as synonyms for each other. For example, some embodiments may be described using the terms "connected" and/or "coupled" to indicate that two or more elements can be in direct physical or electrical contact with each other. The term "coupled," however, also may mean that two or more elements can be not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and can be comprised within the scope thereof. Furthermore, all examples and conditional language recited herein can be principally intended to aid the reader in understanding the principles described in the present disclosure and the concepts contributed to furthering the art, and can be to be construed as being without limitation to such specifically recited examples and conditions. Moreover, all statements herein reciting principles, aspects, and embodiments as well as specific examples thereof, can be intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by general purpose hardware as discussed above, as an alternative the same may also be embodied in dedicated hardware or a combination of software, hardware and/or dedicated hardware. If embodied in dedicated hardware, each can be implemented as a circuit or state machine that employs any one of or a combination of a number of technologies. These technologies may include, but can be not limited to, discrete logic circuits having logic gates for implementing various logic functions upon an application of one or more data signals, application specific integrated circuits having appropriate logic gates, or other components, etc. Such technologies can be generally well known by those of ordinary skill in the art and, consequently, can be not described in detail herein.

The flow charts and methods described herein show the functionality and execution of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s). Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be omitted or not performed. It is understood that all such variations can be within the scope of the present disclosure.

The terms "a" and "an" and "the" and similar referents used in the context of the present disclosure (especially in the context of the following claims) can be to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as though it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein can be not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While various embodiments of the invention have been described herein, it should be apparent, however, that various modifications, alterations, and adaptations to those embodiments may occur to persons skilled in the art with the attainment of some or all of the advantages of the present invention. The disclosed embodiments can be therefore intended to include all such modifications, alterations, and adaptations without departing from the scope and spirit of the present invention as described and claimed herein.

What is claimed is:

1. A lighting control apparatus for a lighting system, the apparatus comprising:
    a circuit board configured with at least one of hardware, firmware, software, or circuitry, or a combination thereof, for performing multiple illumination functions for the lighting system;
    a photocontrol comprising at least one photodiode mounted on the circuit board, the photodiode configured to vary in electrical resistance based on an amount of light present in an ambient environment in which the lighting control apparatus has been installed; and
    at least one control switch structured for:
        accessibility by a user without disassembly of the lighting control apparatus, wherein:
            the control switch is mounted on the circuit board in a location which allows a user to manually turn on and off the photocontrol; and
        the lighting control apparatus being structured to allow the user to remove or insert the lighting control apparatus without opening a fixture in which the lighting control apparatus has been installed.

2. The apparatus of claim 1, further comprising a conduit portion structured for receiving the lighting control apparatus therein.

3. The apparatus of claim 2, wherein the lighting control apparatus is structured to be readily accessible and readily insertable into or readily removable from the conduit portion.

4. The apparatus of claim 2, further comprising a bottom portion of the conduit portion structured for mechanical interaction with the lighting system.

5. The apparatus of claim 1, further comprising the circuit board comprising a control switch circuitry portion including circuitry for directing electrical current in accordance with a selection position of the control switch.

6. The apparatus of claim 1, further comprising the circuit board comprising a printed circuit board.

7. The apparatus of claim 1, further comprising the control switch comprising a two-stage slide switch.

8. The apparatus of claim 1, further comprising a photodiode operatively associated with the circuit board.

9. The apparatus of claim 8, further comprising the circuit board comprising a photodiode circuitry portion including circuitry for directing electrical current flowing in association with the operation and function of the photodiode.

10. The apparatus of claim 1, further comprising a power/communication adapter configured for: operatively interacting with the circuit board, and supplying electrical power and/or communicating control signals to or from the circuit board.

11. The apparatus of claim 10, further comprising the circuit board comprising a power/communication adapter circuitry portion including circuitry for directing electrical current in accordance with at least electrical power or a control signal.

12. The apparatus of claim 1, further comprising a lighting fixture circuit comprising a light-emitting diode (LED) driver operatively connected to an LED light source and to the photocontrol.

13. The apparatus of claim 1, wherein the photocontrol is configured to close the control switch when a sufficient amount of light is sensed in the ambient environment.

14. The apparatus of claim 13, further comprising a lighting fixture circuit comprising a light-emitting diode (LED) driver operatively connected to an LED light source and to the photocontrol.

15. The apparatus of claim 14, further comprising the LED driver configured to respond to a signal associated with electrical current flowing through the photocontrol by turning off output to the LED light source.

16. The apparatus of claim 1, wherein the photocontrol is configured to open the control switch when an insufficient amount of light is sensed in the ambient environment.

17. The apparatus of claim 16, further comprising a lighting fixture circuit comprising a light-emitting diode (LED) driver operatively connected to an LED light source and to the photocontrol.

18. The apparatus of claim 17, further comprising the LED driver configured to respond to a signal associated with electrical resistance of the photodiode by turning on output to the LED light source.

\* \* \* \* \*